United States Patent [19]
Zorn et al.

[11] 3,904,796

[45] Sept. 9, 1975

[54] PROCESS FOR THE PRODUCTION OF POLYURETHANE COATINGS

[75] Inventors: Bruno Zorn; Klaus Noll, both of Cologne; Harald Oertel, Odenthal-Gloebusch; Harro Traubel, Leverkusen, all of Germany

[73] Assignee: Bayer Aktiengesellschaft, Leverkusen Bayerwerk, Germany

[22] Filed: Apr. 20, 1973

[21] Appl. No.: 353,034

[30] Foreign Application Priority Data
Apr. 4, 1972  Germany............................ 2221756

[52] U.S. Cl.... 427/390; 260/33.4 UR; 260/33.6 UB; 260/33.8 UB; 260/75 NH; 260/75 NP; 260/77.5 AN
[51] Int. Cl.$^2$.......................................... B44D 1/02
[58] Field of Search...................... 117/161 KP, 142; 260/33.4 UR, 33.6 UB, 33.8 UB, 75 NH, 75 NP, 77.5 AN

[56] References Cited
UNITED STATES PATENTS

| | | | |
|---|---|---|---|
| 2,853,472 | 9/1958 | Schroeder | 260/77.5 |
| 2,929,800 | 3/1960 | Hill | 260/77.5 |
| 2,957,852 | 10/1960 | Frankenburg | 260/75 |
| 3,446,781 | 5/1969 | Brownsword | 260/75 NH |
| 3,549,569 | 12/1970 | Farah | 117/161 KP |
| 3,609,112 | 9/1971 | Schroeder | 260/33.4 UR |
| 3,678,011 | 7/1972 | Hino | 260/75 NH |
| 3,719,621 | 3/1973 | Vogt | 260/33.4 UB |
| 3,752,786 | 8/1973 | Rossitto | 260/33.4 UR |
| 3,763,078 | 10/1973 | Aldrich | 117/139.5 A |

*Primary Examiner*—Cameron K. Weiffenbach
*Attorney, Agent, or Firm*—Gene Harsh

[57] ABSTRACT

A process for the production of polyurethane coatings having high resistance to light, solvents, bending and abrasion.

The process consists of reacting prepolymers based on cycloaliphatic and aliphatic diisocyanates in equimolar quantitative ratios with special chain extending agents in soft solvents, adding special polyisocyanates to the resulting solutions and then letting the resulting tack free coating set until crosslinking takes place.

10 Claims, No Drawings

PROCESS FOR THE PRODUCTION OF POLYURETHANE COATINGS

This invention relates to a process for the production of polurethane coatings having high resistance to light, solvents, bending and abrasion. More particularly, the invention relates to textile coatings and finishes on leather and artificial leather substrates, produced from polyurethane urea solutions to which relatively large quantities of aliphatic polyisocyanates are added before processing.

BACKGROUND OF THE INVENTION

It is known that solvent-resistant polyurethane coatings can be prepared by mixing solutions of relatively high molecular weight polyurethanes containing small quantities of terminal hydroxyl groups with solutions of high molecular weight, polyisocyanates which are more than divalent, applying the solutions and crosslinking them by heating. Unfortunately, two-component mixes of this kind are unstable, they have only a short pot life of at most only 1 day and they necessitate long drying times before the tackiness of the coating disappears. Also, coatings produced from such mixes show little stability to light because the commercial-grade products used contain aromatic diisocyanates and polyisocyanates.

As well as this two-component process, there is also known a one-component coating process in which substantially linear polyurethanes are dissolved in highly polar solvents such as dimethyl formamide, the resulting solutions applied by spread-coating and the solvent subsequently evaporated off (cf. for example German Pat. Nos. 888,766 and 1,270,276; German Offenlegungsschrift No. 2,025,616). Despite the favorable properties of these coatings, the use of highly polar, high-boiling solvents such as dimethyl formamide is a disadvantage because extremely high furnace temperatures are required, the solvents are toxicologically unacceptable and expensive and, at elevated temperatures, the solutions also penetrate too deeply into the textile structure, hardening the feel of the textile material.

It is also possible to use one-component polyurethanes which are soluble not only in highly polar solvents such as dimethyl formamide, but also in more readily volatile, substantially non-polar solvents, so-called "soft solvents", for example mixtures of toluene and isopropanol, and hence can be applied with conventional apparatus under the usual coating conditions.

Added to this advantage in terms of application there is the further advantage that polyurethanes of the kind based on (cyclo) aliphatic diisocyanates such as 1-isocyanato-3-isocyanatomethyl-3,5,5-trimethyl cyclohexane or dicyclohexyl methane diisocyanate, give extremely light-stable coatings providing they do not contain any aromatic chain-extending agents (for example aromatic diamines).

However, in addition to the advantage of ready application in terms of process technology, these readily soluble polyurethanes have the serious disadvantage that the end products remain soluble or heavily swellable in a number of solvents such as alcohol and aqueous alcohol mixtures, in ketones or esters such as acetone, methylethyl ketone and ethylacetate, and in many cases even in cleaning agents such as trichlorethylene or perchlorethylene. This solubility is an extremely unfavorable property for application in the production of upholstery and textiles or in the leather and artificial leather field.

It is also known that polyurethanes can be cross-linked, for example by formaldehyde derivatives, optionally in the presence of catalysts such as zinc chloride or similar acid compounds. However, it has been found that excessively high temperatures and very long heating times are required in order to initiate crosslinking reactions of this kind so that such processes, although theoretically possible, are of no commercial value. Although the crosslinking time can be shortened by suitable acid catalysis, the pot life of the mixture is shortened in this event. Although crosslinking provides for insolubility, it does not produce an equivalent further improvement in the properties of the polyurethane coatings.

It is also known that aromatic diisocyanates, for example, can be added to substantially linear segmented polyurethane elastomers based on aromatic diisocyanates in solvents such as dimethylformamide, and the crosslinked products can be obtained by heating (for example U.S. Pat. No. 2,957,852). In cases where the commercially preferred alcohols, for example isopropanol are used, admixture with an aromatic polyisocyanate results in a fast reaction accompanied by urethane formation so that its crosslinking effect is lost and, at best, only a very short mixing time (pot life) can be maintained. Also, it is not possible to obtain coatings of high light stability with polyisocyanates of this kind.

DESCRIPTION OF THE INVENTION

It has now been found that polyurethane coatings which are particularly resistant to light and solvents and which are also mechanically resistant can be prepared on a variety of different substrates without any of the disadvantages of conventional processes by reacting prepolymers based on (cyclo) aliphatic diisocyanates in equimolar quantitative ratios with special chain extending agents in soft solvents, adding special polyisocyanates to the resulting solutions and storing the resulting already tack-free coatings at room temperature for a prolonged period during which a considerable improvement in the properties of the end product is obtained through cross-linking.

Accordingly, this invention provides a process for the production of solvent-resistant, light-stable, folding- and abrasion-resistant coatings on textile substrates, leather or artificial leather, from solutions of polyurethanes and polyisocyanates, comprising mixing substantially linear, segmented, film-forming, polyurethane urea elastomers, containing substantially no free NCO or $NH_2$ groups, from prepolymers based on aliphatic and/or cycloaliphatic diisocyanates, optionally additional monomeric diisocyanates of this kind and amino-functional, divalent chain extending agents in the form of their solutions in mixtures of:

a. aromatic and/or chlorinated aliphatic hydrocarbons which are optionally chlorinated; and b. aliphatic and/or cycloaliphatic secondary and/or tertiary alcohols, with non-volatile, aliphatic and/pr cycloaliphatic polyisocyanates having an NCO-functionality of greater than 2.0, in a ratio by weight of 10 : 1 to 1 : 1 (based on solids), applying the resulting solution to the substrate, evaporating the solvent at elevated temperature and allowing the polyurethane coating formed completely to react either by storage at room temperature or by brief heating to a temperature of substantially 150°C.

The process according to the invention, provides a method for the production of solvent-resistant polyurethane coatings from substantially stable one-component solutions of polyurethane ureas in soft solvents with an addition of aliphatic polyisocyanates. Although the pot life of these solutions is not unlimited, it amounts to more than one week at room temperature which completely satisfies commercial requirements.

There is no need for the physical drying operation and the chemical crosslinking operation to be carried out simultaneously during evaporation of the solvents. On the contrary, it is possible initially to produce a non-tacky coating which can be directly wound up by "physical drying", i.e. by evaporation of the solvents, because the polyurethane ureas selected are themselves film-forming and non-tacky and, as finished coatings, already show favorable film properties. The other reactions surprisingly take place in the dried film, even at room temperature, so that there is no need for any further technical measures to initiate the reaction with the aliphatic polyisocyanates. Naturally, the crosslinking reaction takes place much more quickly at higher temperatures for example at 150°C.

The nature of the reactions which take place is not exactly known. It is conceivable that the NCO groups react with the urea groups in the polyurethane urea. Small quantities of polyisocyanate, for example between 1 and 3%, would be adequate for a crosslinking reaction such as this on its own. In view of the smallness of such additions, however, prolonged heating, for example heating for 1 hour, to 110°C, or elevated temperature, for example 3 minutes at 180°C, is generally required to obtain a complete reaction. In this case, however, there is hardly any increase in resistance to solvents and only a slight improvement in other properties of the coatings such as feel, folding strength, fastness to rubbing etc.

Accordingly, distinctly high quantities (more than 10% by weight) of aliphatic polyisocyanates are used in the process according to the invention. It is probable that other reactions or effects have some bearing on this respect, for example polymerization of the NCO groups, although these reactions are not yet known in any detail.

It is extremely surprising that the resistance to solvents, rubbing and folding and also bond strength only reach an optimum with the preferred additions of from about 11 to 50% by weight, preferably from 20 to 40% by weight. The improvement in the properties of the solvent-free polyisocyanate-containing films is actually noticeable after the coatings have been stored for a few days at room temperature.

Basically, embrittlement coupled with reductions in elasticity, folding strength, abrasion resistance and tear-propagation resistance, had been expected to occur through over cross-linking on account of the enormous isocyanate content of the products. By contrast, it was unexpectedly found that the large additions of polyisocyanate preferred in accordance with the invention to the substantially linear polyurethane elastomers gave the best effect. The quantities of polyisocyanate can even be increased to around 100%. In general, the most favorable additions can readily be determined by simple preliminary tests.

It is also surprising that, in spite of the high free isocyanate content of the polymer solutions, their application to substrates produces coatings which are actually tack-free before hardening.

The resulting polyurethane coatings, films, finishes, coverings, etc., are resistant to solvents, they often shown improved flexibility, increased folding and abrasion resistance; they have a dry feel and improved adhesion when applied to textile substrates, webs or polyurethane surfaces (for example microporous films), and when the film surfaces are rubbed on one another, little or no blocking of the kind occurs which is often observed in the case of smooth, non-tacky surfaces and which is found to be particularly troublesome in the clothing and upholstery industry.

Any substantially linear polyurethane ureas based on aliphatic or cycloaliphatic diisocyanates which are soluble in the soft solvents used are suitable polyurethane elastomers for the process according to the invention.

Polyurethane ureas of this kind are prepared by methods known per se. For example, substantially linear polyhydroxyl compounds, preferably dihydroxy polyesters, polyactones and polycarbonates with molecular weights in the range of from about 500 to 5000, preferably from 800 to 3000, and melting points below 60°C, are reacted with the aliphatic or cycloaliphatic diisocyanates in an NCO : OH molar ratio of about 1.5 : 1 to about 5 : 1, to form the NCO prepolymer. If the NCO : OH ratio is greater than 2 : 1, the fully reacted mixture still contains free monomeric diisocyanate. In the following description, the term "NCO-prepolymer" is also intended to cover mixtures of this kind.

The relatively high molecular weight, substantially linear polyhydroxyl compounds mentioned above are intended to be free from aromatic urethane groups (for example, prepolymers for aromatic diisocyanates and an excess of dihydroxy compounds should not be used) so that the fastness to light of the end products remains intact. Although polyacetals and polyethers can, in principle, be used they are less suitable on account of their susceptibility to degradation through oxidation. It is preferred to use polyesters, particularly polyesters from adipic acid and diols or mixtures of diols, for example ethylene and propylene glycol, 1,4-butane diol, 2,2-dimethyl-1,3-propane diol, 1,6-hexane diol or bis-hydroxy methyl cyclohexane. Diols having more than 4 carbon atoms are preferred. Polyesters with a narrow molecular weight distribution which can be obtained by the condensation of caprolactone and diols, are also particularly suitable.

Outstanding resistance to hydrolysis far exceeding conventional polyester properties can be obtained with hexane diol polycarbonates or with hexane diol-adipic acid polyestercarbonates.

In addition to the aforementioned relatively high molecular weight dihydroxy compounds, small quantities (about 0.05 to 2 mols/kg of elastomer) of low molecular weight diols having molecular weights of from about 62 to 400 may also be used for prepolymer formation, for example ethylene glycol, 1,4-butane diol, 2,3-butane diol, 2,2-dimethyl-1,3-propane diol or N-stearyl-N', N'-bis-oxethyl urea. It is particularly preferred to use diols containing tertiary amino groups, for example N,N-bis-(β-hydroxyethyl)-methylamine, N,N-bis-(β-hydroxyethyl)-isopropyl amine, N,N-bis-(β-hydroxypropyl)-tert.-amylamine or bis-(3-aminopropyl)-piperazine because diols of this kind further improve the stability of the polyurethanes to loss of strength on exposure to light.

Examples of aliphatic and cycloaliphatic diisocyanates suitable for the process according to the invention are hexamethylene-1,6-diisocyanate, 2,2,4-trimethyl hexane diisocyanate, 4,8-di-oxa-6,6-dimethyl undecano-1,11-diisocyanate, lysine-$C_1$-$C_6$-ester diisocyanates, 4,4'-dicyclohexyl methane diisocyanate, 3,3'-dimethyl-4,4'-dicyclohexyl methane diisocyanate (preferably in the form of the cis/cis or cis/trans-enriched stereoisomer mixtures) and 1,4-cyclohexane diisocyanate. 1-Isocyanato-3-isocyanatomethyl-3,5,5-trimethyl cyclohexane is particularly perferred because it produces polyurethanes which show the least tendency to gel in solution and which have the best solubility in soft-solvent mixtures.

The isocyanate mixture used for the prepolymer formation contains at least 75% of 1-isocyanato-3-isocyanatomethyl-3,5,5-trimethyl cyclohexane.

Prepolymer formation can be carried out in the melt and/or in inert solvents, for example in toluene or xylene. It is normally carried out at temperatures in the range of from 60° to 150°C, preferably at temperatures in the range of from 80° to 120°C, over reaction times varying from 10 minutes to several hours.

The NCO-prepolymers should show a reactivity which corresponds to an NCO content (based on solid substance) of from about 2.5 to 7%, preferably from 3 to 6%, so that, following chain extension, the required solution viscosity is obtained at the polymer concentration selected. The necessary degree of reaction can be determined in the usual way by simple preliminary tests.

The chain-extending reaction is carried out by a conventional procedure with divalent, low molecular weight compounds, in which case any polyurethanes accumulating in solid form can be dissolved in the required solvents.

Chain extension is preferably carried out with the divalent aminofunctional chain extenders such as (cyclo) aliphatic and araliphatic diamines, hydrazine, or hydrazides. Examples of thse diamines include ethylene diamine, 1,2,- or 1,3-propylene diamine, 1,6-diamino hexane, 2-methyl-1,6-diamino hexane, 1-methyl-2,4-diamino cyclohexane, 1-amino-3-amino methyl-3,5,5-trimethylcyclohexane, 1,3- or, 1,4-bis-amino methyl cyclohexane, 4,4'-diamino dicyclohexyl methane or similar diamines known per se. Other suitable chain extenders include hydrazine, methyl hydrazine or adipic acid dihydrazide, semi-carbazido propionic acid hydrazide, etc.

Particularly preferred compounds are 1-amino-3-amino methyl-3,5,5 -trimethyl cyclohexane, 4,4'-diamino dicyclo hexyl methane and ethylene diamine.

1,4-diamino cyclohexane is a particularly preferred chain extender for prepolymers based on 1-isocyanato-3-isocyanatomethyl-3,5,5-trimethyl cyclohexane because it produces extremely high-melting elastomers with a high softening and flow temperature and, in cis/trans-stereo-isomer mixtures of from about 10 : 90 to 60 : 40, provides the polyurethanes with high solubility.

The polyurethanes formed in the process according to the invention have typical hard segment structures corresponding to the formula

in which D represents divalent aliphatic or cycloaliphatic radicals with 6 to 20 carbon atoms preferably

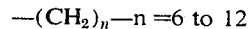

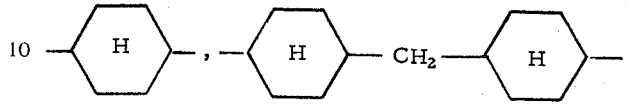

or

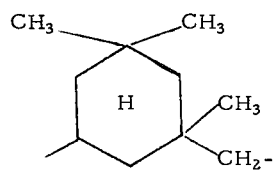

and in which A represents divalent aliphatic or cycloaliphatic radicals with 2 to 20 carbon atoms, preferably
—$(CH_2)_n$—n = 2 to 12

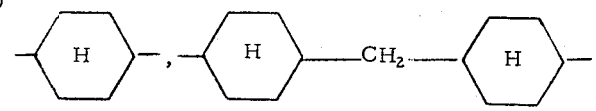

or

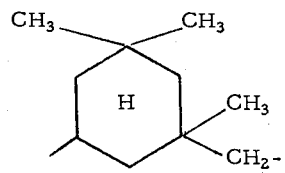

Substantially linear polyurethane ureas containing hard segments in which at least the diisocyanate or the diamine component (i.e. at least one of the radicals A or D in the formula of the hard segment) is derived from the radical

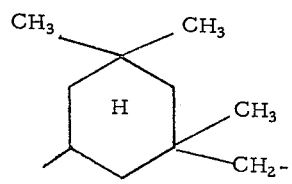

are preferred for the process according to the invention.

The solubility of the products in substantially non-polar solvents (so-called soft solvents, for example toluene/alcohol) is very considerably increased in this way. Hard segments such as these should form at least about half and preferably more than 75% of all the hard segments in the polyurethane.

In addition to the hard segments, the incorporation of low molecular weight dihydroxy compounds into the prepolymer gives structures such as

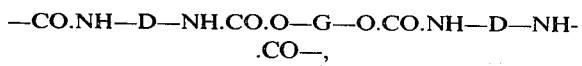

which are attached to the relatively high molecular weight dihydroxy compounds through urethane groups and/or to the hard segments through urea groups.

G represents the radical which emanates from the low molecular weight dihydroxy compound, for example an alkylene or cycloalkylene radical having up to 13 carbon atoms and preferably an N-alkyl-(alkylene)$_x$ radical in which the primary, secondary or tertiary alkyl group has from 1 to 12 carbon atoms while the alkylene groups each contain up to 4 carbon atoms.

Suitable solvents for the substantially linear, aliphatic polyurethane ureas with the aforementioned structures include in particular mixtures of optionally chlorinated aromatic or chlorinated aliphatic hydrocarbons with secondary and/or tertiary aliphatic or cycloaliphatic alcohols. The solutions have a solids content of from about 5 to 40%. Examples of suitable hydrocarbons include toluene, xylene, ethylbenzene, mesitylene, chlorotoluenes, chloroxylenes or hydrocarbon cuts from petroleum or synthesis fractions predominantly containing aromatic hydrocarbons (for example Esso's Solvesso-100 with a boiling range of from 156° to 178°C. and a flashpoint above 45°C), and chlorinated aliphatic hydrocarbons such as trichlorethylene or perchlorethylene. Preferred alcohols are $C_3$ to $C_8$ alcohols such as isopropanol, isobutanol, secondary or tertiary amyl alcohols, secondary or tertiary hexyl alcohols, diacetone alcohol, tert. -butanol, tert. -amyl alcohol and tert. -octyl alcohol.

Mixtures of toluene or xylene with isopropanol, isobutanol or tert. -butyl alcohol have particularly good dissolving properties. The mixtures show better dissolving properties than their individual components. The ratio in which the hydrocarbons and alcohols are mixed is in the range from about 1 : 10 to 10 : 1 and preferably from 1 : 3 to 3 : 1.

Tertiary aliphatic alcohols such as tert. -butanol or tert. -amyl alcohol represent particularly preferred solvent components because the aliphatic polyisocyanates added undergo hardly any undesirable reaction with the OH groups in these solvents at room temperature. Examples of suitable solvent combinations include toluene and/or xylene and/or Solvesso-100 with tert. -butanol and/or tert. -amyl alcohol in mixing ratios of preferably 1 : 3 to 3 : 1.

In practice, primary alcohols are less suitable for the process according to the invention because they undergo a relatively fast reaction with the polyisocyanates added and the pot life of mixtures such as these is undesirably short.

The substantially linear segmented polyurethane urea elastomers used in accordance with the invention should be free from amino-, hydroxy- and NCO groups. When processed from their solutions they give films with non-tacky surfaces and favorable properties although they are still soluble.

By using preferably equivalent or slightly excess quantities of chain extenders (molar ratio approximately 1 : 1 to 1 : 1.5), it can be ensured that the resulting polymer contains hardly any free isocyanate groups. Any NCO groups still present react with the alcohols of the solvent on prolonged standing. If necessary they can also be blocked by the addition of small quantities of monamine. If free amine groups were present in the polymer, addition of the polyisocyanates would immediately produce a marked increase in viscosity and/or crosslinking and the solutions would not be suitable for further processing. Accordingly, polyurethane urea elastomers of the kind in which any troublesome terminal amino groups have been converted into inactive urea or amide groups by reaction with monoisocyanates (for example butyl isocyanate, cyclohexyl isocyanate), acid anhydrides (for example acetanhydride) or other acylating substances (for example pyrocarbonic acid esters), are used in the process according to the invention.

The substantially linear segmented polyurethane urea elastomers free from terminal groups should have an $\eta_i$ -value (equal to the natural logarithm of the relative viscosity $\eta_R$), as measured in 1% hexamethyl phosphoramide solution at 25°C, of more than 0.5 and preferably of more than 0.70.

It can be advantageous to add further solvents as diluents to the solutions before further processing, for example by spraying, knife-coating or pressure coating, in order to adjust the viscosity to the requisite value. The required film-forming rate can be adjusted by adding high-boiling solvents in suitable proportions. Examples of these diluting solvents include methylene chloride, tetrahydrofurane, dioxane, ethylacetate, methylethyl ketone, amyl acetate or, as high-boiling solvents, ethylene glycol monomethyl ether acetate, ethylene glycol monoethyl ether acetate and also dimethyl formamide in small proportions.

Also, additives such as stabilizers, antiagers, antihydrolysis agents, UV-absorbers, soluble dyes, inorganic or organic pigments, fillers, carbon black or white pigments, can be added to the polyurethane solutions in the usual form for the purpose of modification. Plasticizers or other soluble polymers such as nitrocellulose, cellulose esters and ethers and other derivatives and also soluble polymers or polycondensates can also be added, more particularly ethylene-vinyl acetate copolymers or their hydrolysis products in which preferably 20 to 75% of the vinyl acetate groups have been hydrolyzed into hydroxyl groups. These hydroxy groups take part in the reaction with the aliphatic polyisocyanates.

In the process according to the invention, more than 10% by weight of aliphatic or cycloaliphatic polyisocyanates having a functionality of more than 2.0 and a

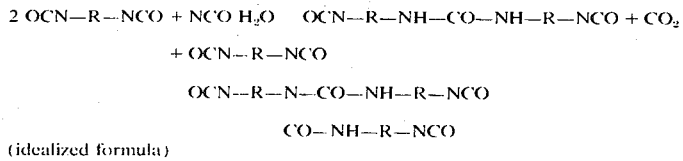

(idealized formula)

very low evaporation rate (lower than that of 1-isocyanato-3-isocyanatomethyl-3,5,5-trimethyl cyclohexane) are added to the solution of the polyurethane urea elastomer. In principle, any substantially involatile (cyclo) aliphatic polyisocyanates both in monomeric form and also, preferably, in dimerized, trimerized or polymerized form or in the form of reaction products, are suitable for this purpose.

Examples of compounds such as these include biuret triisocyanates which can be obtained in idealized form by the following reaction:

R can be an aliphatic radical, for example having 5 to 12 carbon atoms in the chain, or a cycloaliphatic radical, for example a cyclohexane radical, substituted cyclohexane or dicyclohexyl methane radical.

It is preferred to use biuret triisocyanates or polyisocyanates of hexane diisocyanate, 1-siocyanato-3-, isocyanatomethyl-3,5,5-trimethylcyclohexane and of 4,4'-dicyclohexyl methane diisocyanate. Aliphatic polyisocyanates of the kind in which some of the isocyanate groups having been converted by dimerization and trimerization into uretdione or cyanurate structures, are also suitable for the process according to the invention, as are addition products with the idealized oxadiazine trione structure, for example

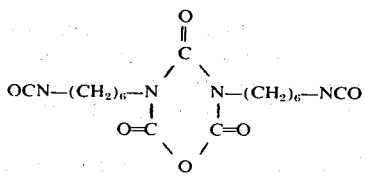

which act in the same way as a triisocyanate by virtue of their ready ability to eliminate $CO_2$. It is also possible to use reaction products of trihydric and polyhydric alcohols with excess (cyclo) aliphatic diisocyanates in the process according to the invention, for example the reaction products of trimethylol ethane, trimethylol propane, glycerin or even relatively low molecular weight, polyhydric branched polyesters or polyesters having molecular weights of up to at most 1000 (preferably up to 600) and excess diisocyanates of the aforementioned structure.

The NCO content of these aliphatic or cycloaliphatic polyisocyanate compounds should be at least 10% by weight and preferably from 15 to 40% by weight, based on polyurethane-solids.

The polyurethane urea solution mixtures can be applied for layer formation to substrates or intermediate substrates by conventional methods, by casting, for example, knife-coating, spread-coating, brush-coating, spray-coating or pressure coating. In relatively thick layers and with relatively "soft" polyurethane settings (low NCO content of the prepolymer used for preparation for example 2.5 to 4.5% by weight NCO), textile coatings are applied for example to nonwoven, woven fabrics or knitted fabrics in any structures and after-treatment stages (for example roughened surfaces). The solutions can also be applied to intermediate substrates, for example to release papers, steel belts, etc., in which case the films formed can be further processed by the reversal technique.

Products having a relatively hard polyurethane setting (NCO content of about 4 to 7% in the prepolymer) are preferably used as surface coats or as finishes for textile coatings, leather or artificial leather and are applied for example by knife-coating, spray-coating or pressure coating.

The process according to the invention is illustrated by the following Examples. Unless otherwise stated, the composition of mixtures is given in parts by weight.

EXAMPLE 1

A Preparation of the elastomer solution:

1890 parts of polyester of 1,4-butane diol and adipic acid with an OH number of 51 (molecular weight 2,200) were mixed with 84 parts of a dimethyl polysiloxane carrying terminal hydroxy methyl groups and having an OH number of 198 (molecular weight 600), and thereafter 710 parts of 1-isocyanato-3-isocyanatomethyl-3,5,5-trimethyl cyclohexane in 4600 parts of xylene were added. The resulting mixture was heated for 120 minutes to 80° – 100°C. On completion of the reaction, the solution had an NCO content of 2.1% (based on solids).

374 parts of 1-amino-3-aminomethyl-3,5,5-trimethyl cyclohexane were dissolved in 4600 parts ot t-butanol. This solution was added slowly with cooling and vigorous stirring to the prepolymer solution until the viscosity of the homogeneous mixture reached approximately 150 poises at 25°C. After a while, the minimal proportion of unreacted isocyanate groups left in the solution reacted with the alcohol of the mixed solvent to form inactive urethane groups. After this solution had been applied by spread-coating and the solvent evaporated off, a clear solid film was formed, being soluble both in the solvent mixture used in its preparation and also in ethyl alcohol.

B. Crosslinking with polyisocyanate

1a. A standard commercial biuret triisocyanate from hexamethylene diisocyanate was added in quantities of 0%, 15%, 20%, 30%, and 35%, and based on the solids content, to a 20% solution of the polyurethane in a mixture of tert. -butanol and xylene (1 : 1), and the resulting 5 solutions were appplied by knife-coating, after 1 week, to 5 samples of a standard commercial polyurethane-coated unfinished fabric in a layer thickness of 12μ. After drying for 1 minute at 120°C, the finishes were dry to the touch. None of the finishes showed adequate fastness to rubbing with an ethanol-dampened cotton cloth (10 × under light pressure). However, the following results were found after the finished products had been stored for 1 week:

| Sample with | 0% | 15% | 20% | 30% | 35 % of isocyanate added |
|---|---|---|---|---|---|
| fastness to rubbing with ethanol | inadequate | poor | moderate | very good | very good |
| fastness to rubbing (VESLIC apparatus, 3 kg load: Schweizer Farbechtheitsprufungsblatt C 4500) | poor | moderate | good | good | very good |

1b. 100 parts of the 20% elastomer solution were mixed with 100 parts of cyclohexanone, 10 parts of a standard commercial carbon black/nitrocellulose pigment paste (Egalonschwarz), 300 parts by weight of a mixture of 50% ethylene glycol, 25% of isopropanol and 25% of toluene and with 0, 3, 4, 6 and 7 parts of the triisocyanate mentioned in Example (1a) (corresponding to 0%, 15%, 20%, 30% and 35%, based on polyurethane-solids). After 2 hours, the mixture was applied by means of a compressed-air spray gun to 5 samples of skiver which had been previously laminated with a standard commercial microporous polyurethane film. After drying for 2 minutes at 100°C, the finishes were dry and non-tacky. However, the resistance of the fresh coatings to alcohol (tested as in Example (1a) was inadequate. After storage for 2 weeks at room temperature, however, testing reveals distinctly improved properties:

| Samples with | 0% | 15% | 20% | 30% | 35% of isocyanate added |
|---|---|---|---|---|---|
| resistance to alcohol | inadequate | poor | good | very good | very good |
| fastness to rubbing (as in Example 1 a) | moderate | good | good | very good | very good |

EXAMPLE 2

A. Preparation of the elastomer solution 475 parts of 1-isocyanato-3-isocyanatomethyl-3,5,5-trimethyl cyclohexane were added to 840 parts of a polyester from hexane diol and adipic acid having an OH number of 133 (molecular weight 840) at 2265 parts of toluene and, for prepolymer formation, the resulting mixture was heated for 120 minutes to 80° – 100°C. Thereafter the solution had an isocyanate content of 2.21%.

194 parts of 1-amino-3-aminomethyl-3,5,5-trimethyl cyclohexane were dissolved in 2265 parts of t-butanol. This solution was slowly added with cooling and vigorous stirring to the prepolymer solution until a viscosity of the homogeneous mixture reached about 150 poises at 25°C. After a while, the minimal quantity of unreacted isocyanate groups left in the solution reacted with the alcohol of the solvent mixture to form inactive urethane groups.

After this solution had been applied by spread-coating and the solvent evaporated off, a clear solid film was formed which was soluble both in the mixed solvent used in its preparation and also in ethyl alcohol.

B. Crosslinking with polyisocyanate 2a. 100 parts of the 25% polyurethane solution in equal parts of tert. -butanol and toluene were applied by knife-coating with ($\beta$ and $\gamma$) and without ($\alpha$) the addition of 35% (11.6 parts, based on dry substance) of the biuret triisocyanate from hexamethylene diisocyanate in the form of a 75% solution (16.6% NCO) in a mixture of xylene and ethylene glycol acetate (1 : 1), to polyurethane-coated textile in a layer thickness of 12 $\mu$ immediately ($\alpha$, $\beta$) and after 2 days ($\gamma$) respectively. By heating for 1 minute to 140°C, the finish became dry and non-tacky. The finishes were tested after 18 days.

|  | $\alpha$ | $\beta$ | $\gamma$ |
|---|---|---|---|
| folding-strength test (wet) according to IUP 10 (DIN 53340) | poor | very good | very good |
| alcohol resistance (tested as in Example 1 a) | poor | very good | very good |

The finishes prepared by the process according to the invention were thus distinctly superior.

2b. Batches of 100 parts of 25% solution of the polyurethane. in tert. -butanol/toluene (1 : 1) were mixed with the following additives:

|  | A | B | C | D | E |
|---|---|---|---|---|---|
| elastomer solution | 100 parts | 100 parts | 100 parts | 100 parts | 100 parts |
| nitrocellulose white pigment | 20 | 20 | 20 | 20 | 20 |
| I | 14 | — | — | — | — |
| II | — | 7 | — | — | — |
| III | — | — | 7 | — | — |
| IV | — | — | — | 9 | — |
| V | 300 | 300 | 300 | 300 | 300 |

I = adduct of 1-isocyanato-3-isocyanatomethyl-3,5,5-trimethyl cyclohexane, trimethylol propane and 1,3-butanol, in the form of a 67% solution in xylene : ethylene glycol acetate (1 : 1); NCO content 9.2%.

II = oxadiazine trione of hexamethylene diisocyanate; NCO content 19.6%

III = isocyanurate from hexamethylene diisocyanate; 20.6% NCO

IV = urethane from hexamethylene diisocyanate and trimethylol propane, 12.1% NCO V = mixture of 50% of ethylene glycol, 25% of isopropanol and 25% of toluene.

Mixtures A–E were each sprayed on to a cotton fabric which had been laminated beforehand with a microporous polyurethane film. After 20 days, testing of the finish gave the following results:

|  | A | B | C | D | E |
|---|---|---|---|---|---|
| alcohol resistance | good | moderate | very good | very good | poor |
| flexometer test (DIN 53340) | good | good | good | good | good |

Comparable results were obtained when a solution of the polyurethane in other solvents, for example isopropanol-toluene (1 : 1), was used. However, a solution of this kind must be used within a few hours after the polyisocyanate has been added.

EXAMPLE 3

A. Preparation of the elastomer solutions 1200 parts of a 1,6-hexane diol polycarbonate having an OH number of 58.25 (molecular weight 1925) were stirred with 25.7 parts of N,N-bis($\beta$-hydroxypropyl)-methylamine, a solution of 405.8 parts of 1-isocyanato-3-isocyanatomethyl-3,5,5-trimethyl cyclohexane in 408 parts of xylene was added at 50°C and, for prepolymer formation, the resulting mixture was heated for 80 minutes to 97° – 101°C. The prepolymer solution had an NCO content of 5.23% NCO (based on solids substance).

43.6 parts of 1,4-diamino cyclohexane (36% cis/64% trans-isomer mixture) were dissolved in 1662 parts of xylene: tert. -butanol (1 : 1). 690 parts of the NCO-prepolymer solution were slowly introduced with vigorous stirring into the resulting solution, which was then stirred for 2 hours at 60°C. resulting in the formation of a homogeneous solution with a viscosity of 430 poises at 20°C.

The diamine was present in an excess of about 11.9 mol%. It was found that if the diamine excess was reduced, solutions of higher viscosity were obtained under similar reaction conditions. Finally, the free amino groups were removed by adding about 10 parts of butyl isocyanate to the solution which resulted in the formation of inactive terminal urea groups.

Evaporation of the solvent from this solution leaves a clear, flexible film having a melting point of 260°C and a softening range beginning at around 245°C. A strip of the film had a tensile strength of 0.65 g/den and a breaking elongation of 453%. The coatings could be redissolved in the solvent mixtures used for their preparation.

Toluene: isopropanol mixtures (30 : 70 to 70 : 30), for example can be used as solvent for preparing the polyurethane urea solution. Similar results were obtained by replacing toluene with trichloroethylene or chlorotoluene.

B. Crosslinking with polyisocyanate

The elastomer solution was mixed:

3a. with 10% by weight of the biuret triisocyanate of hexamethylene diisocyanate; and 3b. with 10% by weight of the biuret triisocyanate according to (3a) and, in addition, 10% by weight of a xylene/tert. -butanol solution (mixing ratio 1 : 1) of a partially (36%) hydrolyzed ethylene/vinylacetate copolymer from 59.8% of ethylene, 17.0% of vinyl acetate and 9% of vinyl alcohol.

and films were prepared from these solutions which remained stable for at least 24 hours. These films (cf. Table)

α). when tested immediately afterwards were soluble in toluene/isopropanol and showed relatively low heat-distortion values (HDT-values), β). after storage for 8 days at room temperature they had become insoluble and showed distinctly high HDT-values coupled with improved resistance to folding and rubbing and an improved surface feel.

3c. The elastomer solution was mixed with 0%, 30%, 50%, 70% and 100% (based on dissolved polyurethane) of the biuret triisocyanate from hexamethylene diisocyanate.

These solutions were applied by knife-coating in a layer thickness of 10 μ to artificial leather consisting of a polyamide fiber web (bonded with an acrylonitrile-butadiene-methacrylamide latex) coated with a 0.3 mm thick microporous, embossed cover layer of polyurethane coagulated in conventional manner. After drying for 2 minutes at 140°C. in a drying tunnel, dry, smooth finishes of pleasant feel were obtained, showing the following test results after storage for 1 week at room temperature:

| Isocyanate addition | 0% | 30% | 50% | 70% | 100% |
|---|---|---|---|---|---|
| alcohol resistance (tested as in Example 1 a) | seriously damaged | undamaged | ditto | ditto | ditto |
| folding strength (wet) according to DIN 53340 | all undamaged | | | | |

Accordingly, the isocyanate addition surprisingly improves resistance to alcohol to a considerable extent without impairing folding strength (even where very large quantities of isocyanate are added).

EXAMPLE 4

A. Preparation of the elastomer solution 900 parts by weight of an adipic acid/hexane diol polyester (molecular weight 845) were heated to 95° – 97°C. with 22.1 parts of N,N-bis-(β-hydroxypropyl)-methylamine, 465.3 parts of 1-isocyanato-3-isocyanatomethyl-3,5,5-trimethyl cyclohexane and 348 parts of toluene until the NCO content was 5.18% (based on solids content).

47.70 parts of β-semi-carbazidopropionic acid hydrazide ($H_2N.NH.CO.NH.(CH_2)_2.CO.NH.NH_2$) were dissolved in twice the quantity of water at around 50°C, an aqueous solution of the extender in a mixture of isobutanol : toluene (1 : 1) was stirred in and the introduction of 600 parts of the NCO-prepolymer solution commenced immediately with vigorous stirring. The initially low-viscosity solution was heated for 4 hours to 50° – 60°C, a slightly hazy, colorless solution being obtained with an increase in viscosity which reaches its final value of 450 poises after 1 day. The $\eta_i$-value amounts to 0.92. The solution dried to form completely transparent films of outstanding light stability. However, the films were soluble or swellable in the solvents used, even in alcohol, and were not sufficiently resistant to solvents in the form of finishes. Their fastness to rubbing under heat is inadequate. The surface of the finish shows a slight blocking effect.

B. Crosslinking with polyisocyanate

The polyurethane solution was applied by knife-coating in a layer thickness of 20 μ to a polyurethane-

TABLE

| Example | Tensile strength d/dtex | Elongation % | Modulus 300% mg/dtex | HDT * °C | Remarks |
|---|---|---|---|---|---|
| 3 a | | | | | |
| α) | 0.84 | 454 | 314 | 123.5 | soluble |
| β) | 0.74 | 335 | 574 | 156.5 | insoluble |
| 3 b | | | | | |
| α) | 0.74 | 448 | 293 | 120.0 | soluble (some insoluble fractions) |
| β) | 0.76 | 353 | 520 | 155.5 | insoluble |

* )heat distortion temperature determined as described in DOS 1,770,591 coated knitted cotton fabric (black) prepared in the usual way by the reversal process, followed by drying. A matt-sheen finish was obtained which has a somewhat dull feel (4a). The test was repeated with the difference that 30% (based on the polyurethane in the solution) of the biuret triisocyanate of hexamethylene diisocyanate was added to the polyurethane solution before knife-coating (4b). Testing of the finishes after 1 week gave the following results:

|  | 4 a | 4 b |
|---|---|---|
| alcohol resistance (98% alcohol measured as in Ex. 1a | very poor (finish rubbed away) | very good (undamaged) |
| folding strength of the wet artificial leather sample 100,000×(according to DIN 53340) | poor (broken) | good (undamaged) |
| feel | dull | smooth |

EXAMPLE 5

A. Preparation of the elastomer solution 720 parts of hexane diol polycarbonate (molecular weight 1925) and 80 parts of adipic acid-1,6-hexane diol/2,2-dimethyl-1,3-propane diol mixed polyester (molecular weight 1670) having a molar ratio of the glycols of 65.35 were dissolved in 266 parts of toluene, the resulting solution was mixed with 121.5 parts of 1-isocyanato-3-isocyanatomethyl-3,5,5-trimethyl cyclohexane and 143.0 parts of dicyclohexyl methane diisocyanate (molar ratio of the diisocyanates 50 : 50) and, for prepolymer formation, the resulting mixture was heated for 2.25 hours to about 98°C (NCO content of the solid prepolymer 5.33%).

9.5 parts of ethylene diamine were dissolved in 690 parts of toluene : isopropanol (1 : 1), and 322.5 parts of the NCO-prepolymer solution were added resulting in the formation of a viscous homogeneous elastomer solution (75 poises/20°C) which was subsequently reacted with 1 part of butyl isocyanate in order to remove excess terminal amino groups. The elastomer substance had a melting point of approximately 210°C, softening beforehand from 175° – 180°C.

B. Crosslinking with polyisocyanate 10, 20 and 40% by weight (based on solid substance) of the biuret triisocyanate of hexamethylene diisocyanate were stirred into batches of the elastomer solution, and films were prepared from the resulting product. When tested immediately after their preparation, these films were not resistant to solvents although, after storage for 1 week, they showed the same resistance to solvents and improved fastness to rubbing as the products of Example 1.

EXAMPLE 6

A. Preparation of the elastomer solution 1300 parts of the hexane diol polycarbonate described in Example 5 and 145 parts of the mixed polyester described in that Example were reacted with 339 parts of 1-isocyanato-3-isocyanatomethyl-3,5,5-trimethyl cyclohexane and 446 parts of toluene at about 98°C to form an NCO prepolymer with an NCO content of 3.69% (based on solid substance).

6a. 8.48 parts of diaminocyclohexane (36/64-cis/trans) were dissolved in 570 parts of a 1 : 1 mixture of perchlorethylene and isopropanol and the resulting solution was stirred with 205 parts of the above prepolymer solution until the viscosity of the approximately 22% solution had risen to 340 poises. The free terminal amino groups were removed by the addition of approximately 0.7 parts of butyl isocyanate.

6b. 4.24 parts of diamino cyclohexane (34/64-cis/trans) were dissolved in 207 parts of trichloroethylene and 89 parts of isopropanol and the resulting solution was stirred with 107.5 parts of the above NCO prepolymer solution to form a homogeneous clear solution having a viscosity of 293 poises/c=22%.

The solutions according to 6a and 6b were applied with and without the addition of 20% by weight of the biuret triisocyanate of hexamethylene diisocyanate to silicone paper in a layer thickness of about 0.1 mm and then dried at 100°C to form films.

Once again, the films were all initially soluble in toluene : isopropanol. When the drying temperature was increased from 100 to 130°C, films 6b with the addition became insoluble, while films 6a with the addition dissolved very slowly. After the films had been stored for 10 days at room temperature, all the films containing the biuret triisocyanate addition were resistant to solvents.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the production of light stable coatings resistant to solvents, folding, and rubbing, on textile, leather, or artificial leather substrates from solutions of polyurethanes and polyisocyanates which comprises:

A. mixing:
  1. a solution of
    a. a substantially linear, segmented film-forming polyurethane urea elastomer containing essentially no free-NCO or NH$_2$ groups, said elastomer prepared from
      i. a prepolymer containing-NCO groups derived from an aliphatic or cycloaliphatic diisocyanate and a polyhydroxyl component, and
      ii. an amino functional divalent chain extender, and
    b. a mixture of
      i. an aromatic or aliphatic hydrocarbon, and
      ii. a C$_3$—C$_8$ aliphatic or cycloaliphatic secondary or tertiary alcohol, the weight ratios of (i) to (ii) being in the range of 1:10 to 10:1, the solids content of said solution being between 5 and 40% by weight, with
  2. a non-volatile, aliphatic or cycloaliphatic polyisocyanate having an NCO-functionality of more than 2.0, said non-volatile aliphatic or cycloaliphatic polyisocyanate being used in a weight ratio of component (1) to component (2) of from 10:1 to 1:1, based on the solids content of component (1), thereby forming a polyurethane coating solution, B. applying said polyurethane coating solution to said substrate, C. evaporating the solvents off at elevated temperatures, and D. allowing the resulting polyurethane coating to react to completion.

2. The process of claim 1 wherein the aromatic and aliphatic hydrocarbons are chlorinated.

3. The process of claim 1 wherein a polyester from 1,6-hexane diol, adipic acid or carbonic acid with a molecular weight of 500 to 5000 are used as the polyhydroxyl component in the prepolymer.

4. The process of claim 1 wherein diols with a molecular weight of 62 to 400 containing tertiary nitrogen atoms are used for formation of the prepolymer.

5. The process of claim 1 wherein ethylene diamine, 1,4-diamino cyclohexane, 1-amino-3-aminomethyl-3,5,5-trimethyl cyclohexane, 4,4'-diamino dicyclohexyl methane, β-semicarbazido propionic acid hydrazide or dihydrazide containing 2 to 10 carbon atoms, are used as chain extenders.

6. The process of claim 1 wherein the ratio by weight of hydrocarbons to alcohols in the mixed solvent is between 1 : 3 and 3 : 1.

7. The process of claim 1 wherein polyisocyanates with biuret, uret dione, cyanurate or oxadiazine-trione structures are used as the non-volatile, aliphatic or cycloaliphatic polyisocyanates.

8. The process of claim 1 wherein the prepolymer contains from 2.5 to 7% by weight of isocyanate groups prior to reaction with said chain extender.

9. The process of claim 1 wherein an isocyanate mixture is used for prepolymer formation, said isocyanate mixture containing at least 75% by weight of 1-isocyanato-3-isocyanatomethyl-3,5,5-trimethylcyclohexane.

10. The process of claim 1 wherein the non-volatile aliphatic or cycloaliphatic polyisocyanate has an NCO content of at least 10% by weight.

* * * * *

UNITED STATES PATENT AND TRADEMARK OFFICE
CERTIFICATE OF CORRECTION

PATENT NO. : 3,904,796
DATED : September 9, 1975
INVENTOR(S) : Bruno Zorn, Klaus Noll, Harald Oertel and Harro Traubel It is certified that error appears in the above-identified patent and that said Letters Patent are hereby corrected as shown below:

First page, [30] Foreign Application Priority Data, filing date of German application should read --May 4, 1972--.

Column 1, line 5, correct the spelling of --polyurethane--.

Column 2, line 63, delete "and/pr" and insert --and/or--.

Column 4, line 7, correct "shown" to read --show--.

Column 8, delete the formula in its entirety and insert

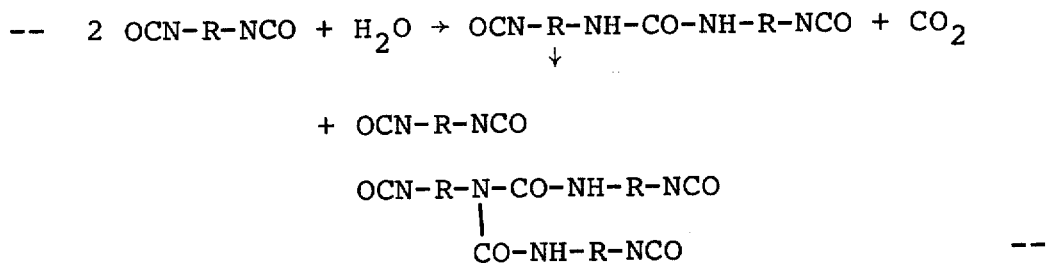

Column 9, line 17, after "hexane diisocyanate," delete the remainder of the line and insert --1-isocyanato-3-, isoc- --.

Signed and Sealed this twenty-ninth Day of June 1976

[SEAL]

Attest:

RUTH C. MASON
Attesting Officer

C. MARSHALL DANN
Commissioner of Patents and Trademarks